Dec. 13, 1938.   W. F. BOLDT ET AL   2,140,100
CLUTCH
Filed Aug. 10, 1936

INVENTORS
WERNER F. BOLDT
GEORGE H. THOMAS
BY
THEIR ATTORNEY.

Patented Dec. 13, 1938

2,140,100

UNITED STATES PATENT OFFICE 2,140,100

CLUTCH

Werner F. Boldt and George Harry Thomas, St. Louis, Mo.; said Boldt assignor to Wagner Electric Corporation, St. Louis, Mo., a corporation of Delaware, and said Thomas assignor to Piero Mariano Salerni, London, England Application August 10, 1936, Serial No. 95,097

5 Claims. (Cl. 192—114)

Our invention relates to clutches and more particularly to locking means for preventing the cooperating elements of the clutch from becoming disengaged.

A general object of our invention is to provide an improved positive clutch.

A more specific object of our invention is to provide an improved locking means for preventing the cooperating teeth of a positive clutch from becoming disengaged during transmission of power therethrough.

Another object of our invention is to provide a locking means for a positive clutch which is unlocked by the same mechanism that disengages the clutch and prior to any disengaging movement of the clutch elements.

A further object of our invention is to produce an improved positive clutch having a locking means which is compact, simple, and efficient in operation.

Figure 1:
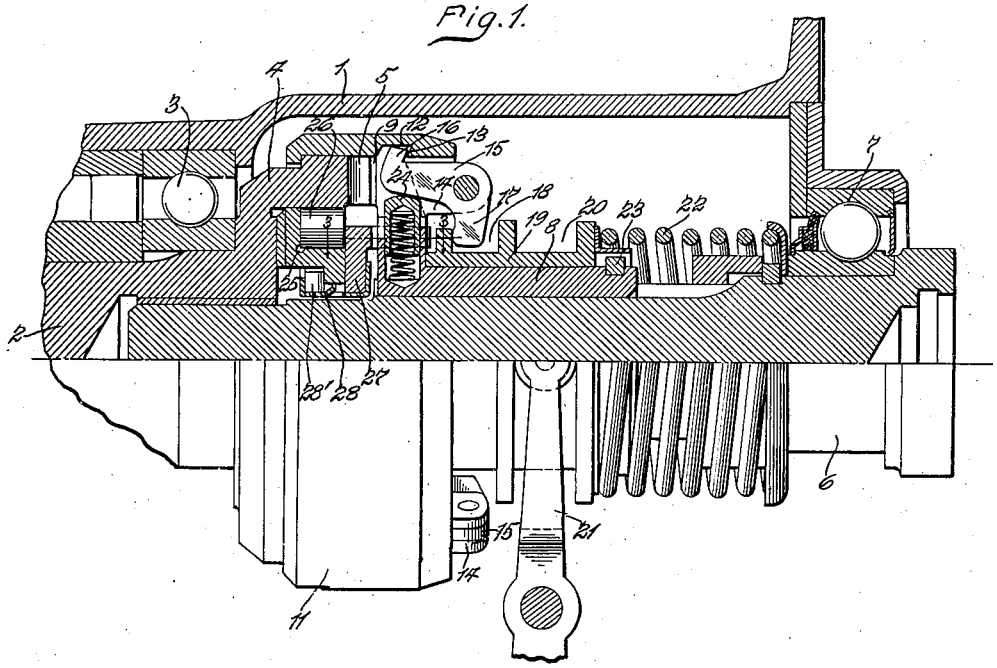
Figure 2:
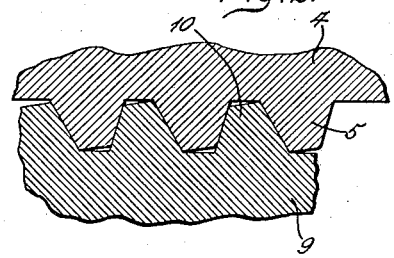
Figure 3:
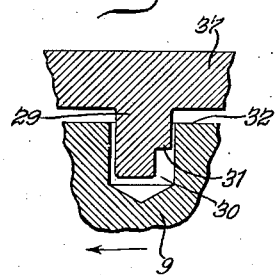

Other objects will become apparent from the following description taken in connection with the accompanying drawing in which Figure 1 is a partial cross-sectional view of a positive clutch mechanism embodying our improved locking means; Figure 2 is a developed cross-sectional view of the cooperating teeth; and Figure 3 is a cross-sectional view, taken on the line 3—3 of Figure 1, showing a portion of the synchronizing or balking means associated with the positive clutch.

Referring to the drawing in detail, our improved clutch mechanism is shown as enclosed within a housing 1 and journaled in one end of this housing is a driving shaft 2 provided with a bearing 3, and the inner end of this driving shaft has formed thereon a bell-shaped clutch element 4 carrying integral teeth 5. The driven shaft 6 is journaled in the other end of the housing by means of a bearing 7 and has its inner end piloted in the inner end of the driving shaft 2. A slidable clutch element 8 is splined upon the driven shaft 6 and is provided with an annular flange 9 from which project the integral teeth 10 for interengaging relation with teeth 5 on the clutch element 4.

The cooperating teeth 5 and 10 are so formed as to have angularly related surfaces, as best shown in Figure 2. The angular relation of these surfaces is such that when the teeth are in engagement and torque is being transmitted thereby, there is set up an axial thrust which tends to disengage the teeth. This axial thrust, however, is not great enough to disengage the teeth but is of sufficient magnitude that the teeth may be disengaged by a slight axial force on the slidable clutch element even though the teeth are under load. With the teeth constructed in the manner shown and described, it is possible that under some circumstances the clutch teeth may become disengaged and in order to insure that this disengagement will not take place unless desired, it is necessary to provide the clutch with locking means for insuring against this possibility.

The locking means shown comprises an annular collar 11 secured to the outer periphery of the clutch element 4 and provided with an internal annular groove 12 forming a locking shoulder 13. The groove overlies flange 9 of the slidable clutch element 8 when this clutch element is in a position where the cooperating teeth 5 and 10 are in interengagement. The rear side of flange 9 has integral therewith three peripherally spaced sets of lugs 14 (two only being shown) upon which are pivoted locking pawls 15. Each of these pawls is provided with a tooth 16 for cooperatively engaging the locking shoulder 13 of collar 11. The other end 17 of each pawl extends into a groove 18 of a sleeve 19 slidably mounted on the outer surface of the hub portion of clutch element 8. This sleeve is also formed with a second groove 20 for receiving the shifting fork 21 which controls both the locking pawls and the clutch element. The sleeve 19 is normally biased into engagement with flange 9 of the clutch element 8 by means of a coil spring 22 surrounding the driven shaft 6. The outer end of the hub of the clutch element 8 is provided with a removable ring 23 forming a stop or abutment spaced from the end of sleeve 19 when said sleeve is engaging flange 9 of the clutch element. The flange 9 also carries in suitable sockets a plurality of spring-biased plungers 24, one for each pawl in order to insure that the tooth of each pawl will engage in groove 12 when in proper position.

Our improved clutch also includes balking means for maintaining the teeth of the clutch elements out of contact during the reengaging movement of the slidable clutch element 8 in order to prevent clashing of the teeth. This structure comprises a ring 25 mounted within the bell-shaped clutch element 4 and is adapted to be driven by said clutch element through a suitable one-way roller connection 26. Positioned adjacent the ring 25 is a balking ring 27 held in frictional engagement therewith by means of collar 28 and an annular corrugated spring 28'. This balking ring carries a plurality of fingers 29 each adapted to extend into an opening 30 formed in flange 9 of the slidable clutch element 8 (see Figure 3. The fingers 29 have landings or shoulders 31 which are adapted, in certain positions, to engage the inner surface 32 of the flange 9 and hold the clutch element from assuming a position where the teeth 5 and 10 contact. When the relative positions of the balking ring 27 and the clutch element 8 are such as to permit the fingers 29 to slide into openings 30, such position occurring when the speed of the driving shaft 2 is slightly greater than the speed of the driven shaft 6—that is, when the driving shaft rotates fast enough to pick up and turn the balking ring by means of the one-way roller connection 26 and the ring 25—then the teeth of the clutch elements will be free to interengage without any clashing.

Referring to the operation of our improved clutch mechanism, it will first be assumed that the teeth of the clutch elements are in cooperative engagement, as shown in Figure 1, and power is being transmitted through the clutch from the driving shaft 2 to the driven shaft 6. If it is desired to disengage the clutch, the operating fork 21 is moved by a suitable connection and in a direction to move the sleeve 19 to the right, as shown in Figure 1. The initial movement of sleeve 19 will cause the pawl 15 to be rotated on its pivot and tooth 16 thereof withdrawn from groove 12, thereby unlocking the clutch. When sleeve 19 has moved sufficiently to perform this unlocking operation, it will engage the stop ring 23 and pick up the slidable clutch element 8. Continued movement of sleeve 19 to the right will result in the disengagement of the teeth of the clutch elements which will readily take place due to their angular surfaces.

With the slidable clutch element 8 in disengaged position the flange 9 will be moved to a position where the shoulders 31 of the balking ring fingers will lie outside of openings 30, and since shaft 6 is rotating in the direction of the arrow (Figure 3), flange 9 of the slidable clutch element will be moved to a position wherein the shoulders 31 are opposite the surface 32. If now the shifting fork 21 is released to permit reengagement of the clutch, spring 22 will immediately move sleeve 19 into engagement with flange 9 and then move the slidable clutch element 8 into abutting relation with shoulder 31 and the balking ring will hold the clutch disengaged and the teeth 5 and 10 out of contact. If the speed of the driving shaft 2 is increased, it will pick up the balking ring 27 (which is rotating with and at the same speed as the driven shaft) by means of the one-way roller connection when the speed of the driving shaft is slightly greater than that of the driven shaft. As soon as the balking ring is driven by the driving shaft it will be moved relatively to flange 9 and to a position where the shoulders 31 on fingers 29 are out of engagement with surface 32. The slidable clutch element 8 is now free to be moved by the action of spring 22 to cause teeth 10 thereof to interengage with teeth 5 of the clutch element 4. As soon as the clutch teeth engage, tooth 16 of each pawl 15 will be pressed into groove 12 and behind the shoulder 13 by spring-pressed plungers 24, thus locking the clutch.

When the driving shaft 2 and the driven shaft 6 are both stationary and it is desired to disengage and reengage the clutch, the shifting fork 21 is operated as already described and, as a result thereof, pawls 15 will be operated to unlock the clutch and then the slidable element will be moved to a position disengaging the cooperating teeth of the clutch elements. Since neither the driving nor driven shafts are rotating, the fingers 29 of balking ring 27 will not be moved out of alignment with the openings 30 in flange 9 to perform any balking operation during the reengaging of the clutch and, therefore, when the shifting fork is released to permit reengagement, the slidable element 8 will be moved to the left and engagement of the teeth will immediately take place. As soon as the teeth are in interengaging relation, the locking tooth 16 will be pressed into groove 12 by spring plunger 24 and thereby lock the clutch.

Our improved clutch mechanism has been found to be very useful in interrupting the drive between the engine and propeller shaft of a vehicle in order to permit the shifting of gears to secure different speed ratios. Its use, however, is not confined to this particular environment as it may be employed wherever it is desired to interrupt the transmission of power between any two shafts or rotating members.

Having fully described our invention, what we claim as new and desire to secure by Letters Patent of the United States is:

1. In apparatus of the class described, a driving shaft, a driven shaft, a clutch element fixed to one of said shafts, a movable clutch element carried by the other shaft and adapted to cooperate with the first named clutch element, means forming an abutment on the first named clutch element, a movable member on the movable clutch element for cooperating with the abutment to lock the clutch elements in cooperative relation, and an operating member for the movable clutch element and the movable locking member and including a lost motion connection between said operating member and said clutch element whereby the locking means will be operated prior to movement of the clutch element.

2. In apparatus of the class described, a driving shaft, a driven shaft, a clutch element carried by one of said shafts and provided with teeth, a slidable clutch element on the other shaft and provided with teeth cooperating with the teeth on the first named clutch element, an abutment carried by the first named clutch element, a pivoted pawl carried by the slidable clutch element and adapted to engage the abutment to lock the clutch elements together when the teeth are in interengaging relation, a slidable member for operating the pawl to disengage it from the abutment, and means for moving the slidable clutch element by the slidable member after the pawl has been operated.

3. In apparatus of the class described, a driving shaft, a driven shaft, a clutch element carried by one of said shafts and provided with teeth, a slidable clutch element on the other shaft and provided with teeth cooperating with the teeth on the first named clutch element, an abutment carried by the first named clutch element, a spring-biased pivoted pawl carried by the slidable clutch element and adapted to engage the abutment to lock the clutch elements together when the teeth are in interengaging relation, a slidable member for operating the pawl to disengage it from the abutment, means for moving the slidable clutch element by the slidable member after the pawl has been operated, and a spring acting on the slidable member for biasing the slidable clutch element toward engaged position.

4. In apparatus of the class described a driving shaft, a driven shaft, a clutch element carried by one of said shafts and provided with teeth, a slidable clutch element on the other shaft and provided with teeth cooperating with the teeth on the first named clutch element, a collar fixed to the first named clutch element and provided with an internal groove, a plurality of spring-biased pawls carried by the slidable clutch element and adapted to engage in the groove when the teeth of the clutch elements are interengaged, a sleeve having a limited sliding movement on the slidable clutch element and provided with means for operating the pawls, and a lever for first sliding the sleeve relative to the slidable clutch element to operate the paws to disengage them from the groove and then sliding the sleeve and the clutch element as a unit to disengage the teeth of the clutch elements.

5. An apparatus of the class described, a driving shaft, a driven shaft, a clutch element carried by one of said shafts and provided with teeth, a slidable clutch element on the other shaft and provided with teeth cooperating with the teeth on the first named clutch element, a collar fixed to the first named clutch element and provided with an internal groove, a plurality of spring-biased pawls carried by the slidable clutch element and adapted to engage in the groove when the teeth of the clutch elements are interengaged, a sleeve having a limited sliding movement on the slidable clutch element and provided with means for operating the pawls, a coiled spring for biasing the sleeve against the slidable clutch element and said clutch element toward the other clutch element, and a lever for first sliding the sleeve relative to the slidable clutch element to operate the pawls to disengage them from the groove and then sliding the sleeve and the clutch element as a unit to disengage the teeth of the clutch elements.

W. F. BOLDT.
GEO. H. THOMAS.